United States Patent
Allen et al.

(10) Patent No.: US 10,703,510 B2
(45) Date of Patent: Jul. 7, 2020

(54) APU CLEANING SYSTEM AND METHOD

(71) Applicant: DELTA AND SIERRA HOLDINGS, LLC, Orlando, FL (US)

(72) Inventors: David Allen, Orlando, FL (US); Joseph S. Showalter, II, Orlando, FL (US)

(73) Assignee: DELTA AND SIERRA HOLDINGS, LLC, Orlando, FL (US)

( * ) Notice: Subject to any disclaimer, the term of this patent is extended or adjusted under 35 U.S.C. 154(b) by 310 days.

(21) Appl. No.: 15/951,164

(22) Filed: Apr. 11, 2018

(65) Prior Publication Data
US 2019/0315491 A1    Oct. 17, 2019

(51) Int. Cl.
*B64F 5/30*    (2017.01)
*B08B 3/04*    (2006.01)
*F01D 25/00*   (2006.01)
*B08B 3/02*    (2006.01)

(52) U.S. Cl.
CPC .............. *B64F 5/30* (2017.01); *B08B 3/02* (2013.01); *B08B 3/04* (2013.01); *F01D 25/002* (2013.01); *F05D 2220/50* (2013.01)

(58) Field of Classification Search
None
See application file for complete search history.

(56) References Cited

U.S. PATENT DOCUMENTS

| | | | |
|---|---|---|---|
| 6,327,991 B1 | 12/2001 | Eichert | |
| 6,358,330 B1 | 3/2002 | Mcgraw | |
| 6,451,125 B1 | 9/2002 | McClure | |
| 8,012,411 B1 | 9/2011 | Betty | |
| 9,757,773 B2 * | 9/2017 | Nordlund | ............. B08B 17/025 |
| 2006/0021640 A1 | 2/2006 | Chu | |
| 2008/0178412 A1 | 7/2008 | Kiter | |
| 2010/0307531 A1 | 12/2010 | Aharonov | |
| 2011/0186096 A1 | 8/2011 | Nordlund | |
| 2013/0098403 A1 | 4/2013 | Zeile | |
| 2015/0122292 A1 | 5/2015 | McDermott | |

\* cited by examiner

*Primary Examiner* — Eric W Golightly
*Assistant Examiner* — Arlyn I Rivera-Cordero
(74) *Attorney, Agent, or Firm* — Mark Young, P.A.

(57) ABSTRACT

A system and method of cleaning an aircraft APU entails positioning an elevated platform beneath the APU compartment, suspending a curtain from the doors of the APU compartment, positioning a basin beneath the curtain, attaching the curtain to the basin and pressure washing the APU or a portion thereof with steam and/or hot water. Runoff collected in the basin is transferred to a storage container for industrial wastewater treatment.

20 Claims, 10 Drawing Sheets

APU CLEANING SYSTEM AND METHOD

FIELD OF THE INVENTION

This invention relates generally to aircraft auxiliary power units (APUs), and, more particularly, to a system and method for cleaning APUs.

BACKGROUND

An aircraft APU is usually run on the ground during passenger boarding and deplaning. The APU turns an electric generator that powers the electrical system when the main engines of an aircraft are off. It also provides pneumatic pressure for air conditioning and starting the main engines. An APU eliminates the need for using an external power source and a noisy air compressor cart to keep the cabin comfy while boarding.

An APU typically includes a jet turbine engine that drives an electrical generator and other equipment, an electronic control unit (ECU), and cockpit-mounted controls. The jet turbine engine of the APU includes one or more compressor stages that draw in and compress outside air. Some of the pressurized air may be diverted from the compressor via bleed air extraction, to supply one or more downstream air conditioning packs.

An air conditioning pack is an air cycle machine (ACM) that serves as a refrigeration unit of an environmental control system (ECS). Many aircraft have two or more air conditioning packs. The air cycle cooling process compresses, cools and expands air (instead of a phase changing refrigerant such as Freon) in the gas cycle. Cooled air output from the process is used directly for cabin ventilation.

Unfortunately, bleed air can be contaminated with various substances, including some arising from heated engine oils, hydraulic fluid and other vaporized contaminants. Consequently, cabin air can be contaminated by various substances that are drawn in through the APU and, via the engine bleed, enters the air-conditioning pack and passes into the aircraft cabin environment. Exposure to fumes and vapors can result in crew and passenger discomfort as well as acute, short-term respiratory problems, and even panic.

By maintaining a clean APU, such contamination may be substantially reduced. By way of example, an APU may be periodically steam-cleaned to remove accumulated contaminants. However, heretofore, such cleaning was performed infrequently because it was costly and time consuming.

Additionally, environmental sensitivities, rules and regulations prohibit wastewater from such a cleaning process to run off onto airport grounds. Such wastewater, which is considered industrial wastewater, should be recycled, reused or discharged for treatment to onsite airport treatment systems or to an offsite treatment facility.

A system and method for frequent rapid cleaning of aircraft APUs without runoff to the ground is needed. The system should be mobile and easy to deploy before a flight. The method should be efficient and reliable.

The invention is directed to overcoming one or more of the problems and solving one or more of the needs as set forth above.

SUMMARY OF THE INVENTION

To solve one or more of the problems set forth above, in an exemplary implementation of the invention, a system and method of cleaning an aircraft APU entails positioning an elevated platform beneath the APU compartment, suspending a curtain from the doors of the APU compartment, positioning a basin beneath the curtain, attaching the curtain to the basin and pressure washing the APU or a portion thereof with steam and/or hot water. Runoff collected in the basin is transferred to a storage container for industrial wastewater treatment. The curtain and basin may be comprised of flexible water-impervious sheet.

A pair of doors are opened to reveal an access port into the APU compartment. The basin has a bottom and sidewalls defining an open top container, and a base and width that are at least as large as the base and width of the access port, beneath which the basin is positioned. The curtain has a height that extends from tops of the doors to the basin, and a width to surround the basin, with an overlap. Top edges of the curtain are attached to the tops of the doors using hook-shaped clips, which are preferably flexible or frangible.

In one embodiment, the bottom of the basin includes a drain, and the method entails removing collected runoff from the basin by draining the runoff through the drain. In another embodiment, a sump pump in the basin pumps collected runoff out of the basin.

The bottom edges of the curtain are releasably attached to top edges of the sidewalls of the basin using hook-and-loop fasteners, hook-and-pile fasteners, touch fasteners or other suitable releasable attachments, such as snaps, zippers, buckles, clips, ties or magnets.

The APU is cleaned with a fluid cleaner by spraying with a stream of pressurized fluid, such as steam or heated water, with or without a cleaning agent.

Runoff drained or pumped from the basin may be collected in a storage container. The collected runoff may then be treated using industrial wastewater treatment steps to remove contaminants. The treatment steps may include filtration, flocculation and separation.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
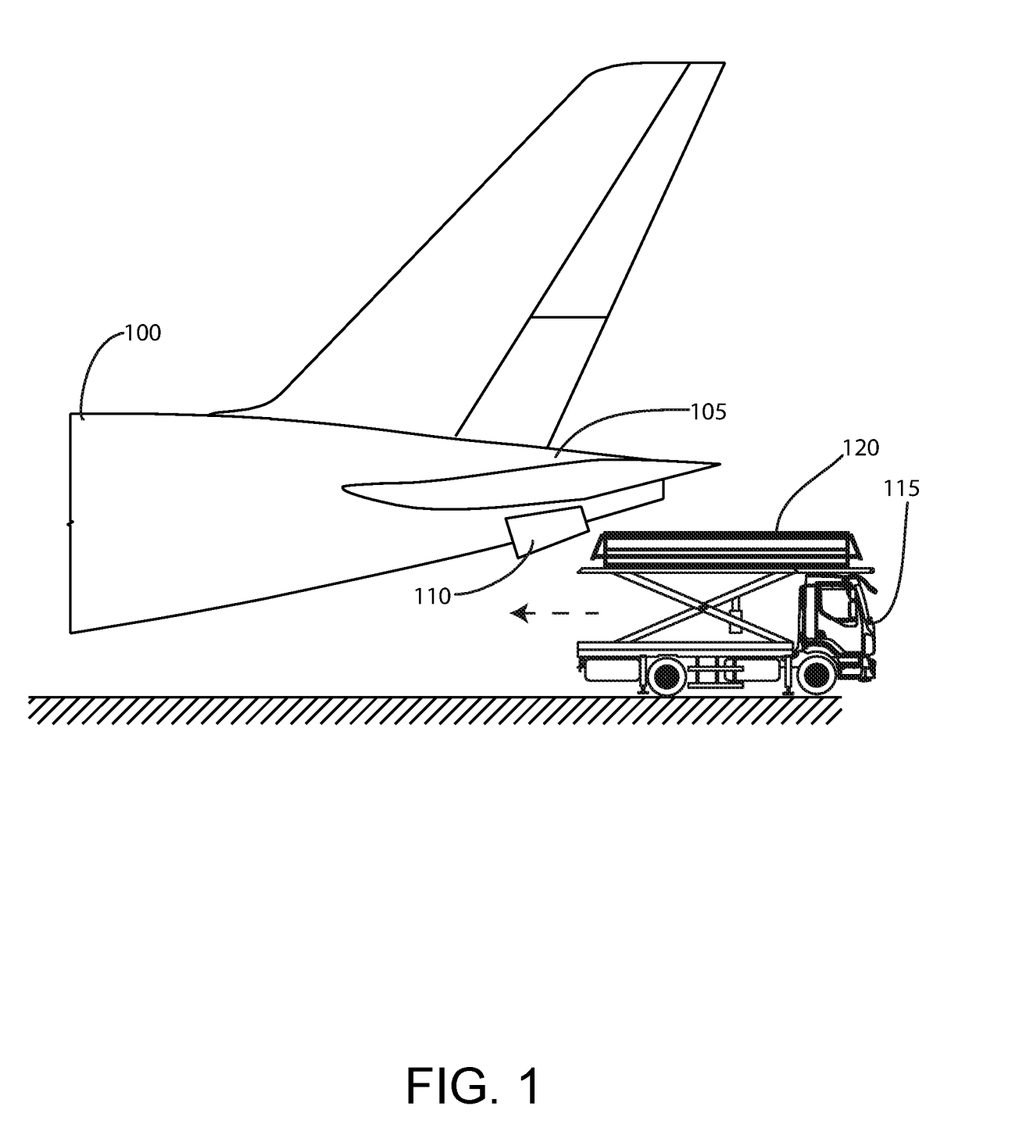
FIG. 1 conceptually illustrates a vehicle with an elevated platform for working at an APU compartment of an aircraft with of an APU washing station according to principles of the invention.

FIG. 1 conceptually illustrates a vehicle with an elevated platform for working at an APU compartment of an aircraft with of an APU washing station according to principles of the invention. In many commercial aircraft equipped with an APU, the APU is located in a compartment at or near the tail end 105 of the fuselage 100, in a fire resistant enclosure in the tail cone of the fuselage, behind a rear pressure bulkhead. The APU compartment is accessible through one or more, typically two, doors 110. The vehicle 115 includes a platform 120 on a lift (i.e., a platform that can be elevated, referred to herein as an elevated platform). Such vehicles are commonly used for servicing aircraft. To clean an APU according to principles of the invention, an APU cleaning station, worker and cleaning equipment are positioned on the platform directly beneath the APU compartment. Use of such a vehicle allows quickly positioning and removing the cleaning station, while other services provided, and without delaying operation of the aircraft.

Figure 2:
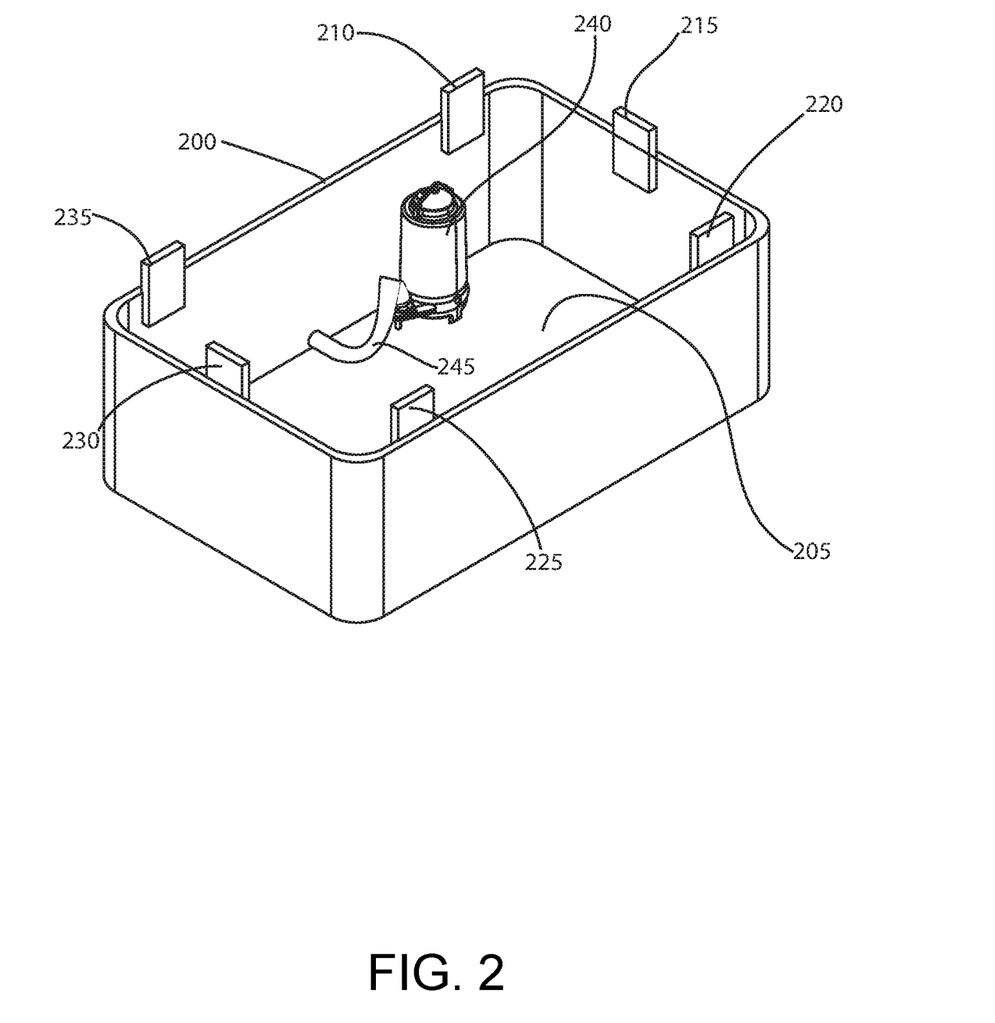
FIG. 2 is a top perspective view of a basin assembly for collecting and transferring wastewater for an APU washing station according to principles of the invention.

FIG. 2 is a top perspective view of a basin assembly 200 for collecting and transferring wastewater for an APU washing station according to principles of the invention. The basin 200 assembly is an open top reservoir for collecting wastewater from an APU cleaning operation according to principles of the invention. The basin 200 defines a compartment 205 in which wastewater (i.e., runoff from cleaning) is collected. The collected matter may include liquid (e.g., water) and contaminants (e.g., oil, hydraulic fluid, solvents, grit and grease). A sump pump 240 and drain line 245 allow controlled transfer (i.e., evacuation) of wastewater from the basin 200. Embodiments, without a pump 240, that utilize gravity to drain the compartment of the basin 200 come within the scope of the invention.

The basin 200 may be a rigid plastic container. Such a container may be comprised of molded thermoplastic, thermosetting polymer, composites or metals. The basin may be formed using any suitable manufacturing technique known in the art or hereafter developed. Such techniques include but are not limited to injection molding, rotary molding, laying up, cold molding, hot molding, or press molding, by way of example and not limitation.

In a particular preferred embodiment, the basin 200 is comprised of a flexible sheet or fabric impermeable to wastewater. By way of example and not limitation, the material may be canvas or polyester coated with polyurethane, or plastic such as polyethylene or vinyl. In one particular example, the vinyl is polyvinyl chloride, industrial-grade and intended for heavy-duty. In this example, the basin may be constructed of at least 10 oz/sq yd (340 g/m2) coated PVC, which is waterproof, exhibits high abrasion resistance and tear strength, and resists oil, acid, grease and mildew. Other materials include 40 oz/sq yd vinyl (e.g., PVC) coated polyester fabric. The flexible material is folded and bonded or stitched into a configuration that includes a bottom and sidewalls defining a compartment 205 in which wastewater may be collected.

Figure 4:
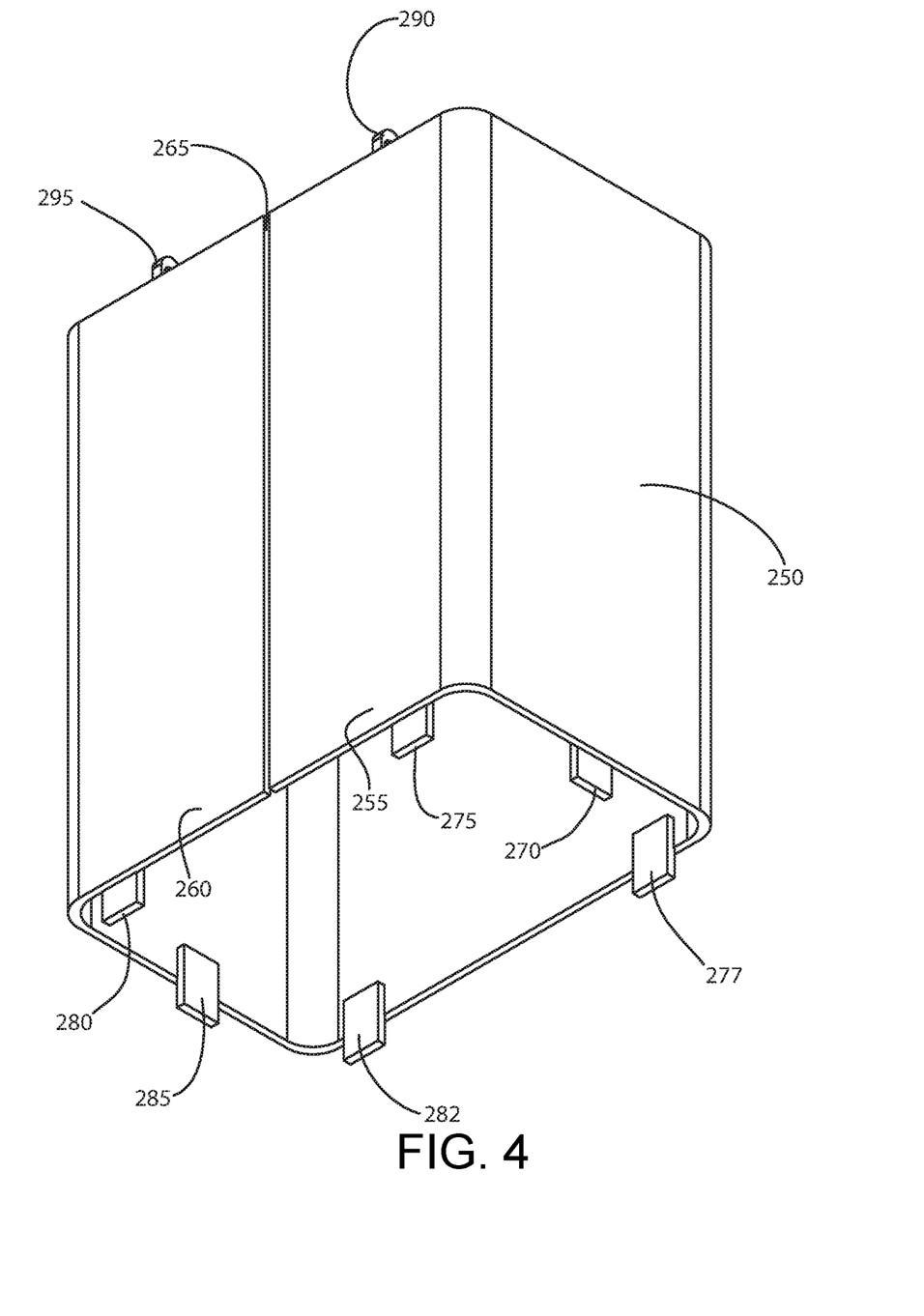
FIG. 4 is a bottom perspective view of a curtain assembly for guiding wastewater into the basin assembly of an APU washing station according to principles of the invention.
Figure 5:
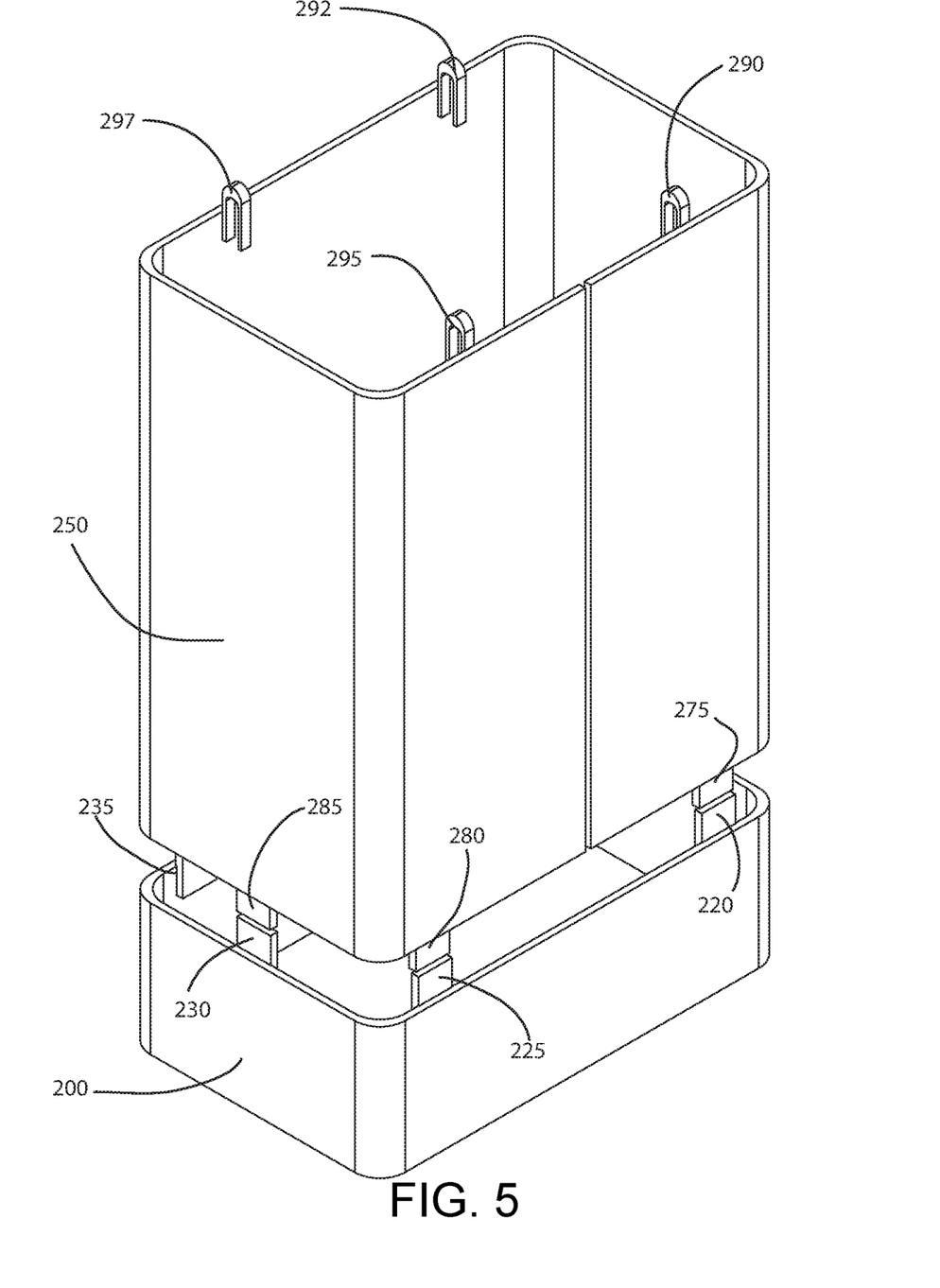
FIG. 5 is a top perspective view of an APU curtain assembly and basin assembly for an APU washing station according to principles of the invention.

One or more attachments extend upwardly from the top edge of the sidewalls of the basin. The attachments are used to attach the top edge of the basin to the bottom edge of a corresponding curtain, as discussed below. In one embodiment, the attachments comprise one part of hook-and-loop fasteners, hook-and-pile fasteners or touch fasteners, which consist of two components—typically, two lineal fabric strips which are attached (sewn, bonded or otherwise adhered) to the opposing surfaces to be fastened. In the illustrated embodiment, six attachments 210, 215, 220, 225, 230 and 235 are shown, extending upwardly from the top edge of the basin 200. In alternative embodiment, more or fewer attachments are provided. By way of example and not limitation, in one embodiment, a single attachment extends across and upwardly from the entire top edge of the basin 200. Each such attachment 210, 215, 220, 225, 230 and 235 releasably attaches to the mating element 270, 275, 277, 280, 282 and 285 of the fastener, which is attached to and extends downwardly from the bottom edge of a curtain 250 (FIG. 4).

The invention is not limited to hook-and-loop fasteners, hook-and-pile fasteners or touch fasteners. Alternative attachments, such as snaps, zippers, buckles, clips, ties and magnets may be utilized to connect the bottom edge of the curtain 250 to the top edge of the basin 200, without departing from the scope of the invention.

Figure 3:
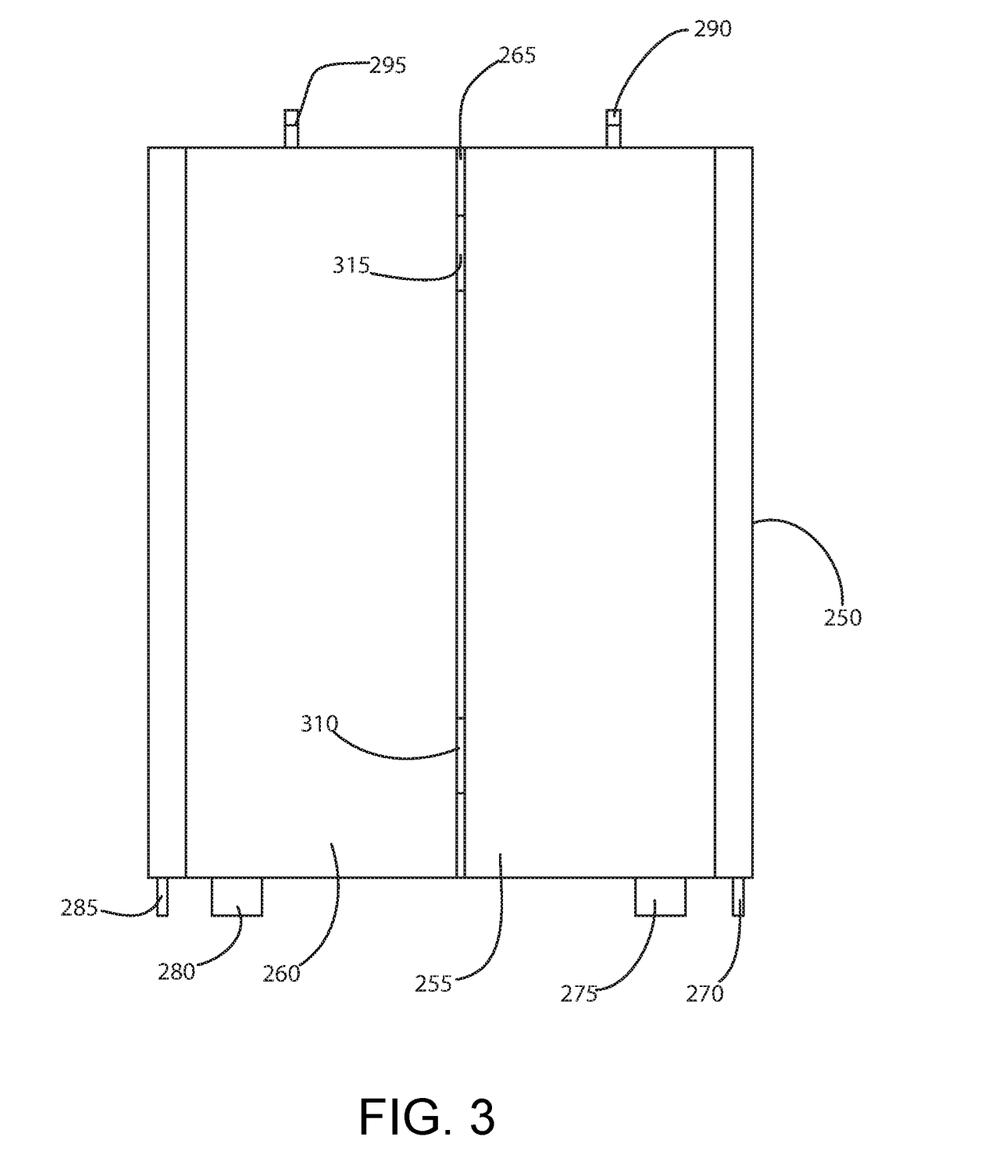
FIG. 3 is a front view of a curtain assembly for guiding wastewater into the basin assembly of an APU washing station according to principles of the invention.

The curtain 250 is comprised of a flexible sheet or fabric impermeable to wastewater. By way of example and not limitation, the material may be canvas or polyester coated with polyurethane, or plastic such as polyethylene or vinyl. In one particular example, the vinyl is polyvinyl chloride, industrial-grade and intended for heavy-duty. In this example, the curtain 250 may be constructed of at least 10 oz/sq yd (340 g/m2) coated PVC, which is waterproof, exhibits high abrasion resistance and tear strength, and resists oil, acid, grease and mildew. Other materials include 40 oz/sq yd vinyl (e.g., PVC) coated polyester fabric.

The curtain 250 extends upwardly from the basin 200 to the underside of fuselage 105 beneath the APU compartment opening (i.e., access port). The height from the bottom of the basin 200 to the compartment opening is sufficient for a worker to stand in the basin 200 surrounded by the curtain while reaching into and accessing the APU compartment. Curtain heights of at least 4 feet, preferably at least 5 feet, and more preferably at least 6 to 9 feet are preferred. Such heights accommodate a wide range of work platform heights, fuselage configurations, door heights and worker stature's. The curtain 250 should include sufficient material to provide a base and width at least equal to that of the basin 200. When attached to the basin 200, the curtain 250 defines an enclosure within which a worker may conduct a cleaning process.

The bottom end of the curtain 250 should extend into the basin 200 at the top edge of the basin 200, when the attachments 210, 215, 220, 225, 230 and 235 and 270, 275, 277, 280, 282 and 285 are releasably attached. Thus, runoff down the interior side of the curtain will flow into the basin 200, instead of flowing outside of the basin 200.

Attachments 290, 292, 295 and 297 (upper attachments) extend from the top edge of of the curtain. These attachments 290, 292, 295 and 297 engage the top edge of an open APU compartment door. In a preferred embodiment, the attachments are hook-shaped (e.g., U, J or V-shaped) 290, 292, 295 and 297 clips. The clips 290, 292, 295 and 297 slide over or onto the top edge of the door. In a particular preferred embodiment, the clips 290, 292, 295 and 297 are flexible plastic clips, which together exhibit sufficient structural integrity to bear a multiple (i.e., a multiple that is greater than one) of the weight of the curtain. However, if excessive force is applied, such as if a worker slips and grabs the curtain 250, the clips will bend and release from the APU compartment door without causing damage to the door. As an alternative to flexible plastic clips, frangible (breakaway) clips comprised of metal (e.g., aluminum) or plastic may be utilized. As another alternative, one or more straps may be used to cinch the top portion of the curtain to the APU door. Nonlimiting examples of such straps include straps with cam buckles and ratchet tie-down straps.

One or more attachments 270, 275, 277, 280, 282 and 285 extend across mating side edges of opposite ends 255, 260 of the curtain 250. The attachments are used to releasably secure the mating side edges in a closed configuration, preferably with one edge overlapping the other. In one embodiment, the attachments comprise mating parts of hook-and-loop fasteners, hook-and-pile fasteners or touch fasteners on the opposing surfaces to be fastened. In the illustrated embodiment, two attachments are shown, extending horizontally. In alternative embodiment, more or fewer attachments are provided. By way of example and not limitation, in one embodiment, a single attachment extends across and upwardly along each side.

One or more attachments 270, 275, 277, 280, 282 and 285 extend downwardly from the bottom edge of the curtain 250. The attachments 270, 275, 277, 280, 282 and 285 are used to attach the top edge of the basin 200 to the bottom edge of the curtain, as discussed below. In one embodiment, the attachments comprise one part of hook-and-loop fasteners, hook-and-pile fasteners or touch fasteners, which consist of two components, two lineal fabric strips which are attached (sewn, bonded or otherwise adhered) to the opposing surfaces to be fastened. In the illustrated embodiment, six attachments 270, 275, 277, 280, 282 and 285 are shown, extending downwardly from the bottom edge of the curtain 250. In alternative embodiment, more or fewer attachments are provided. By way of example and not limitation, in one embodiment, a single attachment extends across and downwardly from the entire bottom edge of the curtain 250. Each such attachment 270, 275, 277, 280, 282 and 285 releasably attaches to the mating element 210, 215, 220, 225, 230 and 235 of the fastener, which is attached to and extends upwardly from the top edge of a basin 200.

The invention is not limited to hook-and-loop fasteners, hook-and-pile fasteners or touch fasteners. Alternative attachments, such as snaps, zippers, buckles, clips, ties and magnets may be utilized to connect the bottom edge of the curtain 250 to the top edge of the basin 200, and to connect opposite side edges of the curtain 250, without departing from the scope of the invention.

Figure 6:
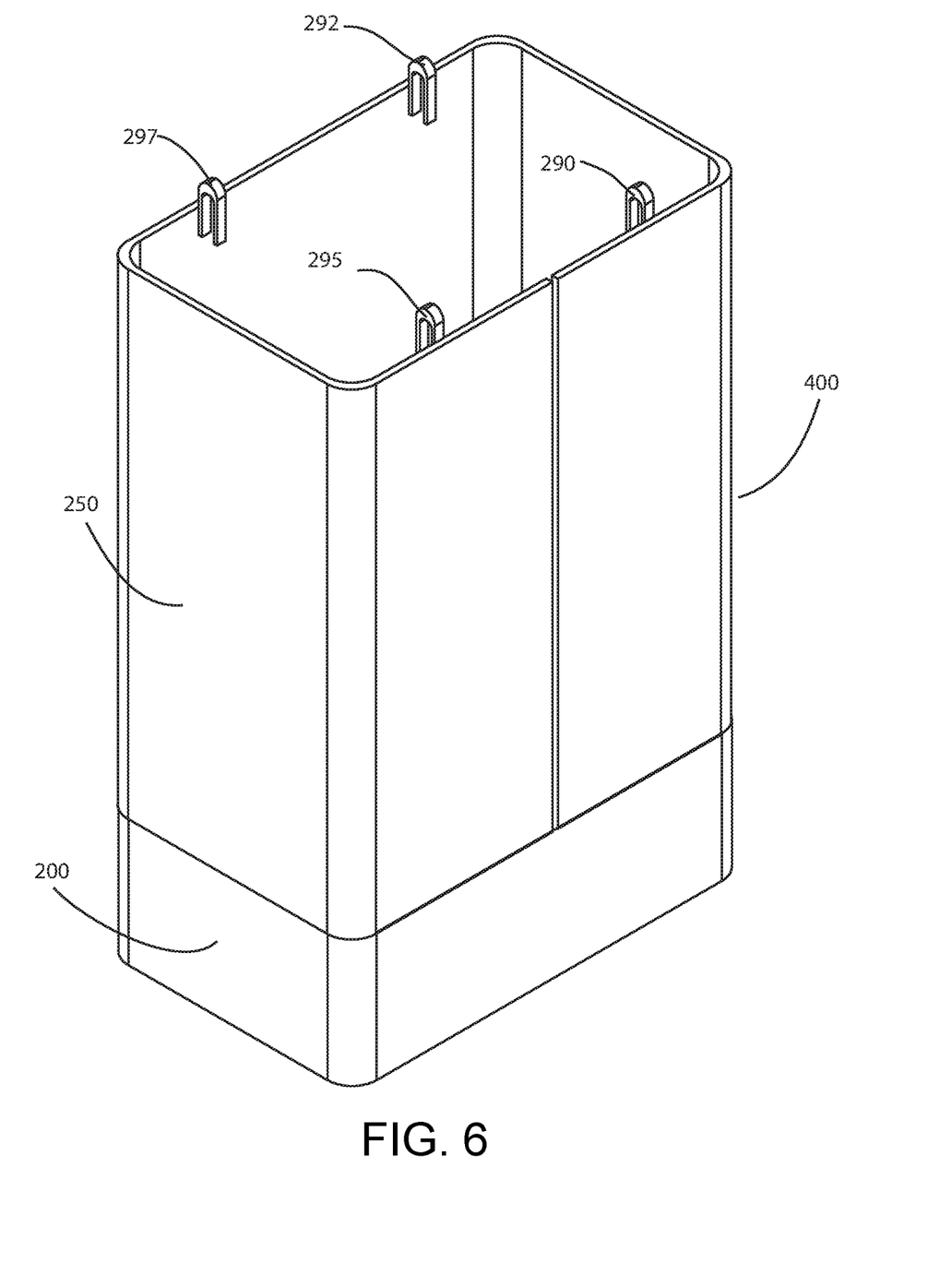
FIG. 6 is a top perspective view of an APU washing station comprised of a curtain assembly attached to a basin assembly according to principles of the invention.

With reference to FIGS. 5-9, after the upper attachments 290, 292, 295 and 297 are secured to an APU door, the curtain 250 is attached to the basin 200. The bottom edge of the curtain 250 is attached to the top edge of the basin 200 using the mating attachments, 210, 215, 220, 225, 230 and 235 and 270, 275, 277, 280, 282 and 285. A worker may perform this attachment step while standing inside the basin 200. Additionally, attachments 310, 315 are fastened to secure mating side edges of opposite ends 255, 260 of the curtain 250 while the worker stands within the enclosure 400 formed thereby. FIG. 6 conceptually illustrates the curtain 250 attached to the basin 200.

Figure 7:
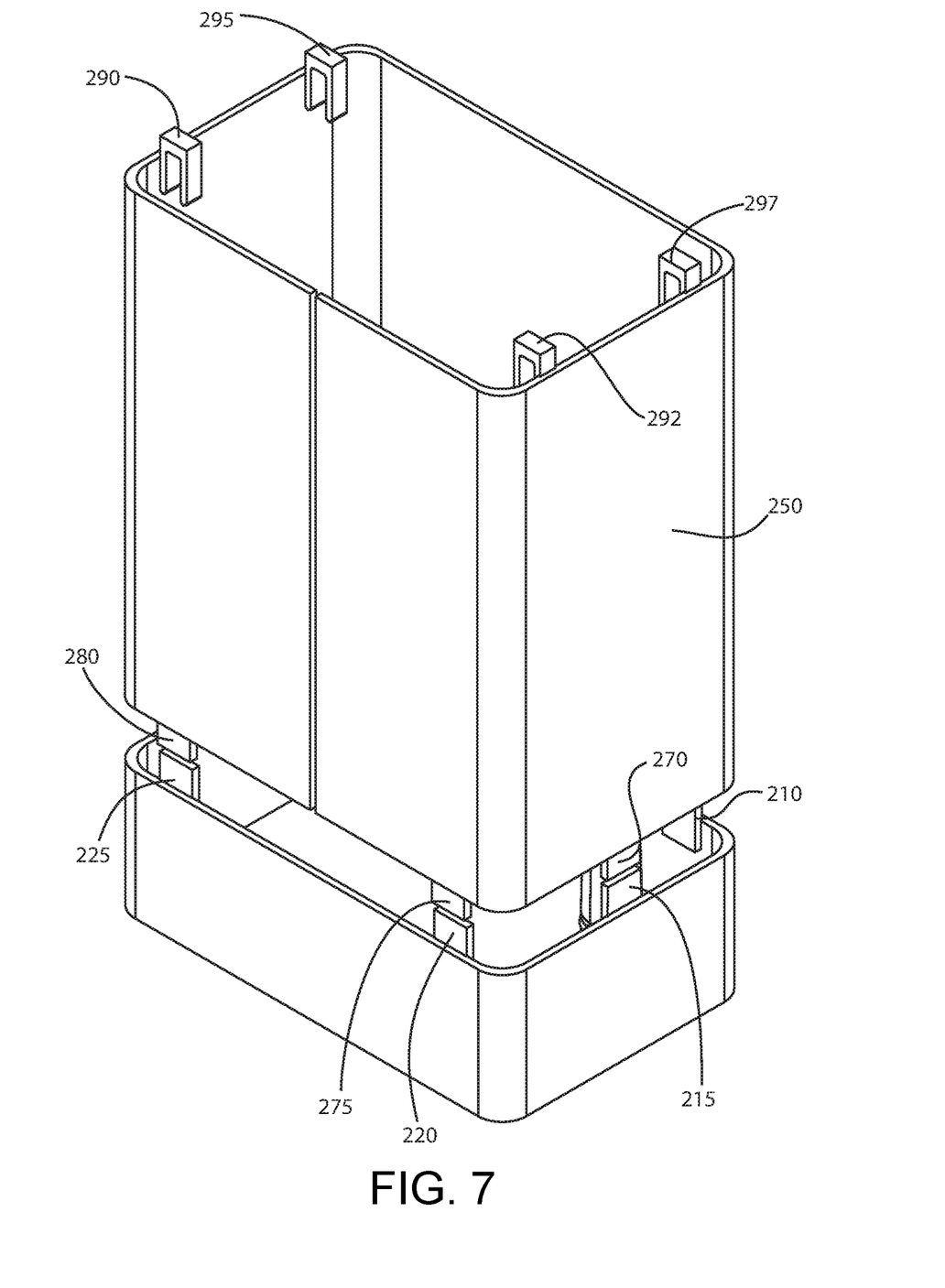
FIG. 7 is a top perspective view of another APU curtain assembly and basin assembly for an APU washing station according to principles of the invention.

FIG. 7 is a top perspective view of another APU curtain assembly and basin assembly for an APU washing station according to principles of the invention. In this embodiment, the clips 290, 292, 295 and 297 extending from the top edge of the curtain 250 are attached to different sides. Of course, the clips may be attached to all sides of the top edge of the curtain to provide versatility in attaching to various fuselage and APU door configurations. It is not necessary that every clip engage a door edge.

Figure 8:
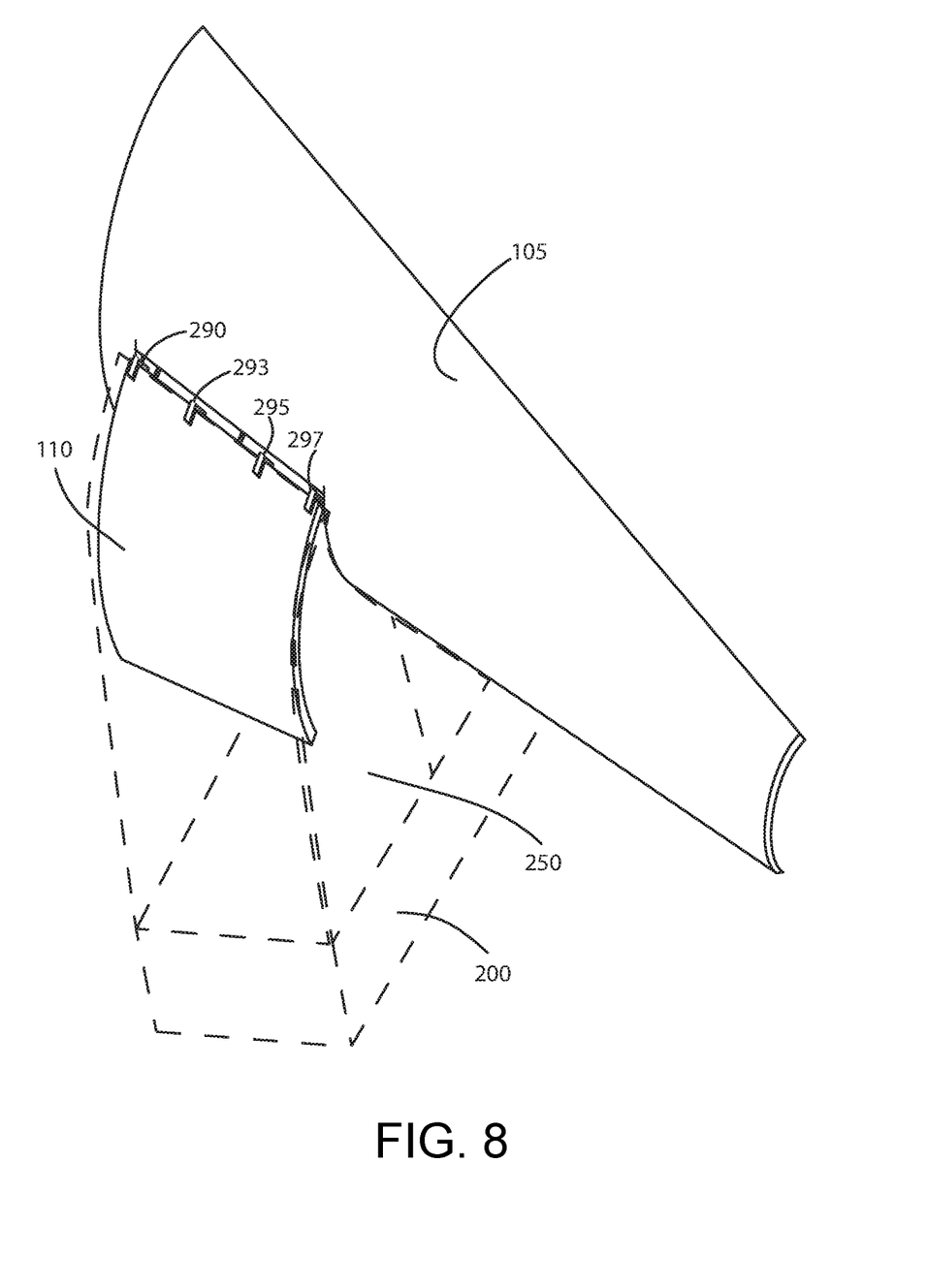
FIG. 8 conceptually illustrates an open APU compartment door with door hooks attached to the top edge of the open door for suspending an APU curtain assembly from the door according to principles of the invention.

FIG. 8 conceptually illustrates an open APU compartment door 110 with door hooks (i.e., clips) 290, 292, 295 and 297 attached to the top edge of the open door for suspending curtain assembly 250 from the door 110 according to principles of the invention. The opposite side of the fuselage includes another similar door with a top edge to which clips will attach. Thus, the curtain 250 attaches to the top edges of a pair of open APU compartment doors while an elevated work platform 120 supports the basin 200 below the curtain 250. The upper portions of the curtain 250 extending from door to door are bunched against the underside of the curvaceous fuselage 105 of the aircraft 100.

Figure 9:
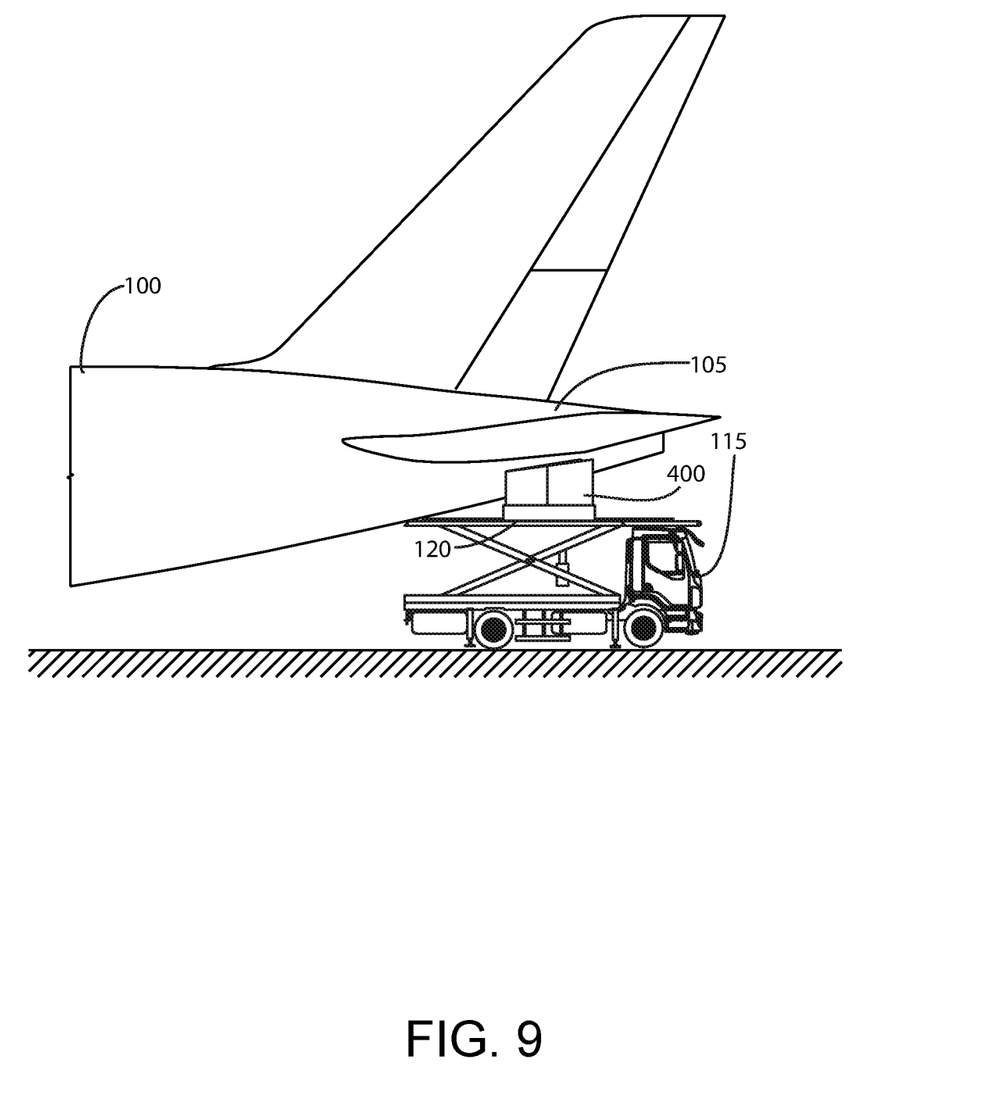
FIG. 9 is a side view of an APU washing station setup on an elevated platform of a vehicle according to principles of the invention.

FIG. 9 is a side view of an APU washing station enclosure 400 setup on an elevated 120 platform of a vehicle 115 according to principles of the invention. The enclosure 400 is comprised of the curtain 250 and basin 200, with the bottom edge of the curtain 250 attached to the top edge of the basin 200, and the top edge of the curtain 250 attached to top edges of APU compartment doors. A worker, equipped with cleaning equipment, stands within the enclosure 400, with access to the APU compartment for cleaning.

The cleaning equipment removes grease, oil, dirt, grime and other contaminants from the APU compartment and the APU, particularly in the vicinity of the APU inlet. The cleaning equipment should function without damaging the aircraft or APU.

In a preferred embodiment, the cleaning equipment is a spray wand with a trigger and an outlet nozzle connected by a hose to a pressurized steam cleaner or hot water pressure washer. The pressurized steam cleaner or hot water pressure washer may be located outside the enclosure 400 while a hose leads to the spray wand within the enclosure 400. Such systems generally include a pump fluidly coupled to a water source, a coil through which the water flows for heating, a burner or electrical heating elements, and a discharge apparatus, such as a hose and wand with a trigger (i.e., trigger actuated valve) and an outlet nozzle. Equipment of this type is controlled primarily by switching the pump and heater on and then manipulating the wand as necessary to spray the object being cleaned. Such equipment includes an electric motor or an engine driven high pressure liquid pump. Generally, the pump has a water inlet which is connected through a hose to a water main or tank. Optionally, a suitable cleaning solution may be mixed with the water either at the pump or upstream or downstream from the pump. The pump increases pressure of the water or other liquid from a relative low inlet pressure to a significantly higher outlet pressure. The high pressure water is delivered to a wand for directing a water spray at a surface to be cleaned. Normally, the wand includes a manually operated trigger valve for turning the water flow on and off, and a nozzle which shapes the spray pattern and determines the velocity of the high pressure spray. When the valve is closed, the pump can be subjected to a high static load. An unloader valve may be provided for allowing the pump to continue to operate by recirculating the water through the unloader valve back to the inlet to the pump. When the pump is driven by an electric motor, a pressure responsive switch may be provided to shutdown the pump and motor either directly or via a timer when the water discharge valve (trigger gun) is closed to prevent excess wear on the motor and pump, excess heat generation and unnecessary energy consumption.

While a pressurized steam cleaner is preferred, the invention is not limited to any particular cleaning equipment. Other cleaning equipment may be utilized within the enclosure 400, without departing from the scope of the invention.

The curtain 250 directs runoff from the cleaning equipment into the basin 200. Runoff collects in the basin 200 until the cleaning step is completed. Such runoff is industrial wastewater. The collected industrial wastewater may be drained or pumped into receptacles for treatment and/or disposal in accordance with airport policies and applicable laws.

Industrial wastewater treatment entails processes for treating wastewater produced, as runoff, by APU cleaning. After treatment, the treated industrial wastewater (or effluent) may be reused or released to a sanitary sewer or to a surface water in the environment. Nonlimiting examples of contaminants may include oils, grease, hydraulic fluids, hydrocarbons, solvents, detergents and grit. Most solids can be removed using simple sedimentation techniques with the solids recovered as slurry or sludge. Very fine solids and solids with densities close to the density of water pose special problems. In such case filtration or ultrafiltration may be required. Flocculation may be used, using alum salts or the addition of polyelectrolytes.

Effective removal of oils and grease depends upon the characteristics of the substance in terms of its suspension state and droplet size, which will in turn affect the choice of separator technology. Oil in industrial waste water may be free light oil, heavy oil, which tends to sink, and emulsified oil, often referred to as soluble oil. Emulsified or soluble oils may require "cracking" to free the oil from its emulsion, such as by lowering the pH of the water matrix. Separator technologies will have an optimum range of oil droplet sizes that can be effectively treated. Oil skimmers may be used to remove most of the oil before using membrane filters and chemical processes to remove more. Any of various separators (e.g., an American Petroleum Institute (API) separator) may be used for further oil removal.

Figure 10:
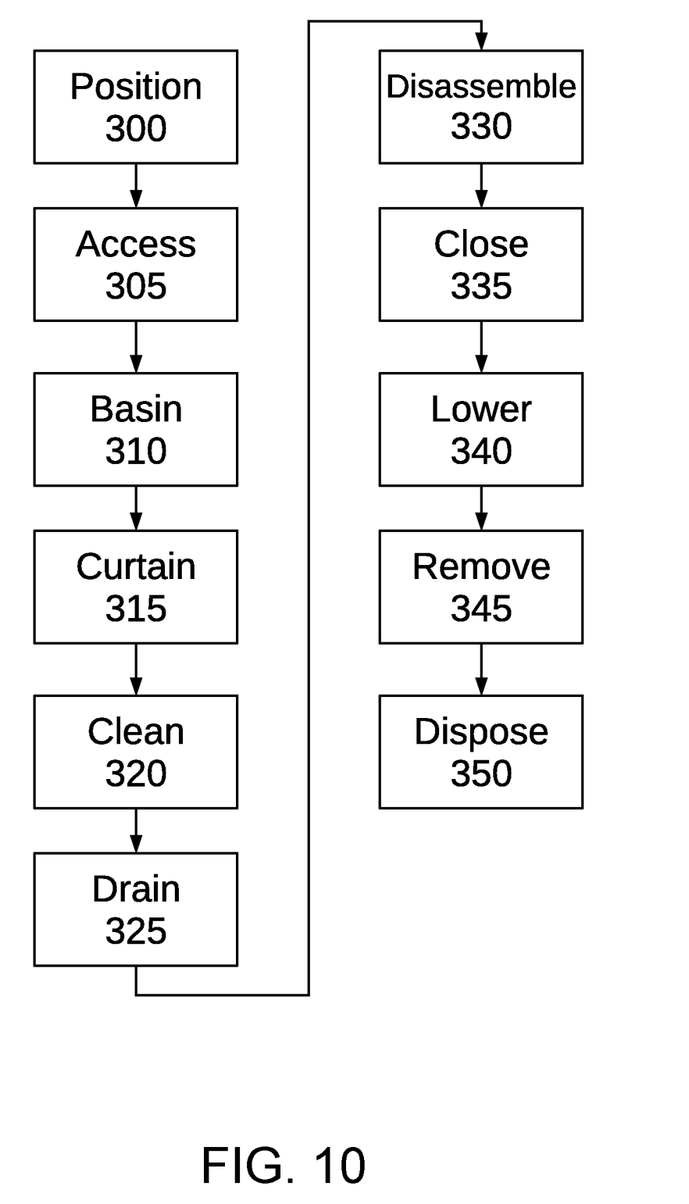
FIG. 10 is a flowchart of steps of a method of cleaning an APU using an APU washing station and an elevated platform of a vehicle according to principles of the invention.

FIG. 10 is a flowchart of steps of a method of cleaning an APU using a washing station 400 and an elevated platform of a vehicle according to principles of the invention. Step 300 entails positioning a work platform 110 with a basin 200, curtain 250, worker and cleaning equipment on the platform 110, beneath and within the worker's reach of the top of the access doors of an APU compartment.

Step 305 entails accessing the APU compartment by opening the doors. Access to the APU for inspection, maintenance and servicing is provided by two cowl doors located under the APU compartment. Typically, a latch is released to open the doors. After the latch is released, the doors may pivot downwardly on hinges under the influence of gravity. One or both doors may include clasps, hooks, cables, deadbolts or other mechanisms that must be released or disengaged to allow opening.

Step 310 entails setting up the basin 200. If the sides of the basin 200 are folded, they should be unfolded. The basin 200 should be oriented and positioned beneath the access port to the APU compartment.

Step 315 entails attaching the curtain 250 to the doors of the APU compartment and to the basin 200. Using attachments, such as clips or a belt, the top of the curtain 250 is attached to the top edges of the open doors. Then, using attachments, such as hook and loop fasteners, the bottom of the curtain 250 is attached to the basin 200. A worker, standing within the basin 200 surrounded by the curtain 250 may fasten the attachments.

Step 320 entails cleaning. A worker within the assembled cleaning station 400 utilizes cleaning equipment, such as a pressure sprayer wand connected to a hose, to spray hot water and/or steam into the APU compartment and onto soiled components of the APU. The worker may wear industrial garments suitable for work in a wet environment. The garments may include waterproof boots and gloves, and a face mask. The heating element, motor and water supply of the pressure sprayer are external to the cleaning station 400 and fluidly coupled top the wand with a hose. A portion of the hose extends through an opening in the curtain 250 or between the curtain 250 and basin 200. As the worker sprays the compartment and APU, wastewater with contaminants run into the basin 200.

Step 325 entails emptying collected wastewater from the basin 200. In one implementation, a drain in the bottom of the basin may be opened to allow the collected wastewater to flow freely from the basin through the drain, through an outlet hose to a collection container. In another implementation, a sump pump may be provided in the basin and activated to pump wastewater from the basin through an outlet hose to a collection container.

After draining, the cleaning station may be disassembled by releasing all attachments. Hooks, clips or belts may be disengaged from the APU compartment doors. Attachments between the curtain 250 and basin 200 may be disconnected. Attachments sealing the curtain 250 are also released. Then the released curtain and basin and any other components may be removed from the platform, cleaned and properly stored for subsequent use.

Step 335 entails closing the APU compartment. The access doors are moved to their closed positions. All latches and other door retention mechanisms that were removed or disengaged to allow opening, are reinstalled or reengaged.

After the APU compartment is closed, the platform may be lowered, as in step 340. Then the vehicle on which the platform is mounted may be removed to allow unimpeded motion of the aircraft, as in step 345. After such removal, the aircraft may proceed unimpeded.

Subsequently, the wastewater collected in one or more containers may be provided to an industrial wastewater treatment facility. The containers may be delivered to a wastewater treatment service provider, or emptied into a storage vessel for periodic pickup by a service provider.

Advantageously, steps 300 through 345 may be performed in less than one hour, in many cases less than thirty minutes by as trained worker, and in some cases in about fifteen minutes or less by a trained worker, for most aircraft. Cleaning according to principles of the invention between flights substantially reduces any risk of foul odors and contaminants entering the cabin through bleed air. The method may be performed without any damage to the aircraft and without any wastewater contaminating airport grounds.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method of cleaning an aircraft auxiliary power unit contained within a compartment in a fuselage, said compartment being accessible through a pair of doors, the method comprising: opening the pair of doors to reveal an access port into the compartment, the access port having a base and width;
   providing a basin, the basin having a bottom and sidewalls defining an open top container, the basin having a base and width that are at least as large as the base and width of the access port, the basin being comprised of flexible sheet material impervious to water;
   positioning the basin beneath the access port by placing the basin on an elevated platform and positioning the elevated platform beneath the access port, the elevated platform being operably coupled to a vehicle;
   providing a curtain, the curtain having a height to extend from tops of the doors to the basin, and the curtain having a width to surround the basin, the curtain being comprised of flexible sheet material impervious to water;
   releasably attaching top edges of the curtain to the tops of the doors;
   releasably attaching bottom edges of the curtain to top edges of the sidewalls of the basin, thereby forming a substantially enclosed cleaning station at the access port;
   cleaning at least a portion of the APU with a fluid cleaner by spraying the portion of the APU with a stream of pressurized fluid cleaner, the pressurized fluid cleaner including at least one of steam and water; and
   collecting, in the basin, runoff from the cleaned portion of the APU.

2. The method of cleaning an aircraft auxiliary power unit according to claim 1, further comprising providing a pump in the basin, and pumping collected runoff out of the basin.

3. The method of cleaning an aircraft auxiliary power unit according to claim 1, wherein the top edges of the curtain are releasably attached to the tops of the doors by engaging the tops of the doors with flexible hook-shaped clips; and
   the bottom edges of the curtain are releasably attached to top edges of the sidewalls of the basin using one of hook-and-loop fasteners, hook-and-pile fasteners and touch fasteners.

4. The method of cleaning an aircraft auxiliary power unit according to claim 1, further comprising transferring runoff collected in the basin to a storage container and then removing contaminants from the runoff by at least one of filtration, flocculation and separation.

5. A method of cleaning an aircraft auxiliary power unit contained within a compartment in a fuselage, said compartment being accessible through a pair of doors, the method comprising: opening the pair of doors to reveal an access port into the compartment, the access port having a base and width;
   providing a basin, the basin having a bottom and sidewalls defining an open top container, the basin having a base and width that are at least as large as the base and width of the access port;
   positioning the basin beneath the access port;
   providing a curtain, the curtain having a height to extend from tops of the doors to the basin, and the curtain having a width to surround the basin;
   releasably attaching top edges of the curtain to the tops of the doors;
   releasably attaching bottom edges of the curtain to top edges of the sidewalls of the basin, thereby forming a substantially enclosed cleaning station at the access port;
   cleaning at least a portion of the APU with a fluid cleaner; and
   collecting, in the basin, runoff from the cleaned portion of the APU.

6. The method of cleaning an aircraft auxiliary power unit according to claim 5, the basin being comprised of flexible sheet material impervious to water.

7. The method of cleaning an aircraft auxiliary power unit according to claim 5, the curtain being comprised of flexible sheet material impervious to water.

8. The method of cleaning an aircraft auxiliary power unit according to claim 5, the bottom of the basin including a drain, and the method further comprising a step of removing collected runoff from the basin.

9. The method of cleaning an aircraft auxiliary power unit according to claim 5, further comprising providing a pump in the basin, and pumping collected runoff out of the basin.

10. The method of cleaning an aircraft auxiliary power unit according to claim 5, wherein the top edges of the curtain are releasably attached to the tops of the doors by engaging the tops of the doors with clips.

11. The method of cleaning an aircraft auxiliary power unit according to claim 5, wherein the top edges of the curtain are releasably attached to the tops of the doors by engaging the tops of the doors with flexible hook-shaped clips.

12. The method of cleaning an aircraft auxiliary power unit according to claim 5, wherein the top edges of the curtain are releasably attached to the tops of the doors by engaging the tops of the doors with frangible hook-shaped clips.

13. The method of cleaning an aircraft auxiliary power unit according to claim 5, wherein the bottom edges of the curtain are releasably attached to top edges of the sidewalls of the basin using one of hook-and-loop fasteners, hook-and-pile fasteners and touch fasteners.

14. The method of cleaning an aircraft auxiliary power unit according to claim 5, wherein the bottom edges of the curtain are releasably attached to top edges of the sidewalls of the basin using one snaps, zippers, buckles, clips, ties and magnets.

15. The method of cleaning an aircraft auxiliary power unit according to claim 5, wherein positioning the basin beneath the access port comprises placing the basin on an elevated platform and positioning the elevated platform beneath the access port.

16. The method of cleaning an aircraft auxiliary power unit according to claim 15, the elevated platform being operably coupled to a vehicle.

17. The method of cleaning an aircraft auxiliary power unit according to claim 5, wherein at least a portion of the APU is cleaned with a fluid cleaner by spraying the portion of the APU with a stream of pressurized fluid, the pressurized fluid including at least one of steam and water.

18. The method of cleaning an aircraft auxiliary power unit according to claim 17, the pressurized fluid further including a cleaning agent.

19. The method of cleaning an aircraft auxiliary power unit according to claim 5, further comprising transferring runoff collected in the basin to a storage container.

20. The method of cleaning an aircraft auxiliary power unit according to claim 19, further comprising removing contaminants from the runoff from the storage container by at least one of filtration, flocculation and separation.

\* \* \* \* \*